US012558951B2

(12) United States Patent
Yokota et al.

(10) Patent No.: US 12,558,951 B2
(45) Date of Patent: Feb. 24, 2026

(54) DRIVE UNIT

(71) Applicant: NISSAN MOTOR CO., LTD.,
Yokohama (JP)

(72) Inventors: Mamoru Yokota, Kanagawa (JP);
Youji Okano, Kanagawa (JP); **Yuki
Tsukagoshi, Kanagawa (JP); Kazuhiro
Hayakawa, Kanagawa (JP); Takuma
Kinoto**, Kanagawa (JP)

(73) Assignee: NISSAN MOTOR CO., LTD.,
Yokohama (JP)

( * ) Notice: Subject to any disclaimer, the term of this
patent is extended or adjusted under 35
U.S.C. 154(b) by 307 days.

(21) Appl. No.: 18/561,622

(22) PCT Filed: May 19, 2021

(86) PCT No.: PCT/JP2021/019058
§ 371 (c)(1),
(2) Date: Nov. 16, 2023

(87) PCT Pub. No.: WO2022/244164
PCT Pub. Date: Nov. 24, 2022

(65) Prior Publication Data
US 2024/0239177 A1     Jul. 18, 2024

(51) Int. Cl.
*B60K 6/40*          (2007.10)
*B60K 6/26*          (2007.10)
(Continued)

(52) U.S. Cl.
CPC .................. *B60K 6/40* (2013.01); *B60K 6/26*
(2013.01); *B60K 6/36* (2013.01); *B60K 6/46*
(2013.01);
(Continued)

(58) Field of Classification Search
CPC ... B60K 6/40; B60K 6/26; B60K 6/36; B60K
6/46; B60K 6/50; F16H 37/065; F16H
57/0006; F16H 57/035; F16H 2057/0012;
F16H 2057/02034; F16H 2057/02052;
B60Y 2200/92
See application file for complete search history.

(56) References Cited

U.S. PATENT DOCUMENTS 9,309,933 B2 *   4/2016   Date .................. F16D 25/12
9,376,008 B2 *   6/2016   Abe .................... B60K 5/1216
(Continued)

FOREIGN PATENT DOCUMENTS

JP          2002-316541 A          10/2002
JP          2017-216804 A          12/2017
(Continued)

*Primary Examiner* — John D Walters
(74) *Attorney, Agent, or Firm* — Foley & Lardner LLP

(57) ABSTRACT
A drive unit includes: an electric unit including a first
electric motor for driving, a deceleration mechanism con-
figured to transmit a rotation torque of the first electric motor
to a drive wheel, a second electric motor configured to be
driven by an internal combustion engine to generate electric
power, and an acceleration mechanism configured to trans-
mit a rotation torque of the internal combustion engine to the
second electric motor. The first electric motor, the decelera-
tion mechanism, the second electric motor, and the accel-
eration mechanism are housed in one housing.

5 Claims, 3 Drawing Sheets

(51) Int. Cl.

| | | |
|---|---|---|
| *B60K 6/36* | (2007.10) | |
| *B60K 6/46* | (2007.10) | |
| *B60K 6/50* | (2007.10) | |
| *F16H 37/06* | (2006.01) | |
| *F16H 57/00* | (2012.01) | |
| *F16H 57/02* | (2012.01) | |
| *F16H 57/035* | (2012.01) | |

(52) U.S. Cl.

CPC ............. *B60K 6/50* (2013.01); *F16H 37/065* (2013.01); *F16H 57/0006* (2013.01); *B60Y 2200/92* (2013.01); *F16H 2057/0012* (2013.01); *F16H 2057/02034* (2013.01); *F16H 2057/02052* (2013.01); *F16H 57/035* (2013.01)

(56) References Cited

U.S. PATENT DOCUMENTS

| | | | |
|---|---|---|---|
| 10,457,266 B2 * | 10/2019 | Kodama | ............... F16H 61/684 |
| 10,828,977 B2 * | 11/2020 | Aikawa | ................. B60K 6/387 |
| 2014/0374211 A1 | 12/2014 | Date | |
| 2015/0291018 A1 | 10/2015 | Abe et al. | |
| 2019/0009770 A1 | 1/2019 | Kodama et al. | |
| 2019/0070947 A1 | 3/2019 | Aikawa et al. | |

FOREIGN PATENT DOCUMENTS

| | | | |
|---|---|---|---|
| JP | 2019-014345 A | 1/2019 | |
| WO | WO-2013/129011 A1 | 9/2013 | |
| WO | WO-2014/083984 A1 | 6/2014 | |
| WO | WO-2018/008160 A1 | 1/2018 | |

* cited by examiner

DRIVE UNIT

TECHNICAL FIELD

The present invention relates to a drive unit for a series hybrid vehicle.

BACKGROUND ART

JP2017-216804A discloses a drive device for a vehicle that is fastened to an engine and includes: an electrical generator having a first housing fastened to a transmission, and a drive having a second housing fastened to the transmission. In such a drive device in which the electrical generator and the drive are respectively housed in different housings, the two housings vibrate individually, and there is a problem that the vibration becomes larger due to bending, twisting, or the like of the electrical generator and the drive. In addition, there is also a problem that resonance is likely to occur due to two vibration sources approaching each other. In order to solve such problems, in the above document, a first housing and a second housing are coupled by a coupling member.

SUMMARY OF INVENTION

However, in the drive device disclosed in the above document, since only a part of the first housing and the second housing that vibrate individually is coupled, an effect of suppressing the vibration is limited.

Accordingly, an object of the present invention is to provide a drive unit in which the effect of suppressing the vibration is further improved.

According to one embodiment of the present invention, a drive unit comprising an electric unit, the electric unit including a first electric motor for driving, a deceleration mechanism configured to transmit a rotation torque of the first electric motor to a drive wheel, a second electric motor configured to be driven by an internal combustion engine to generate electric power, and an acceleration mechanism configured to transmit a rotation torque of the internal combustion engine to the second electric motor is provided. In this drive unit, the first electric motor, the deceleration mechanism, the second electric motor, and the acceleration mechanism are housed in one housing. In the housing, the first electric motor and the second electric motor are arranged in a front-rear direction of a vehicle with their respective rotation shafts parallel, and the deceleration mechanism and the acceleration mechanism are arranged in the front-rear direction of the vehicle. The electric unit and the internal combustion engine are connected in a state of being arranged in a left-right direction of the vehicle, a first rotation shaft which is the rotation shaft of the first electric motor and a second rotation shaft which is the rotation shaft of the second electric motor are located on a front side and a rear side in the front-rear direction of the vehicle with a crankshaft rotation axis which is a rotation axis of a crankshaft of the internal combustion engine interposed therebetween, and when viewed in the left-right direction of the vehicle, the crankshaft rotation axis is located at a midpoint of a motor connecting line which is a line connecting the first rotation shaft and the second rotation shaft.

DESCRIPTION OF EMBODIMENTS

Hereinafter, embodiments of the present invention will be described with reference to the drawings.

Figure 1:
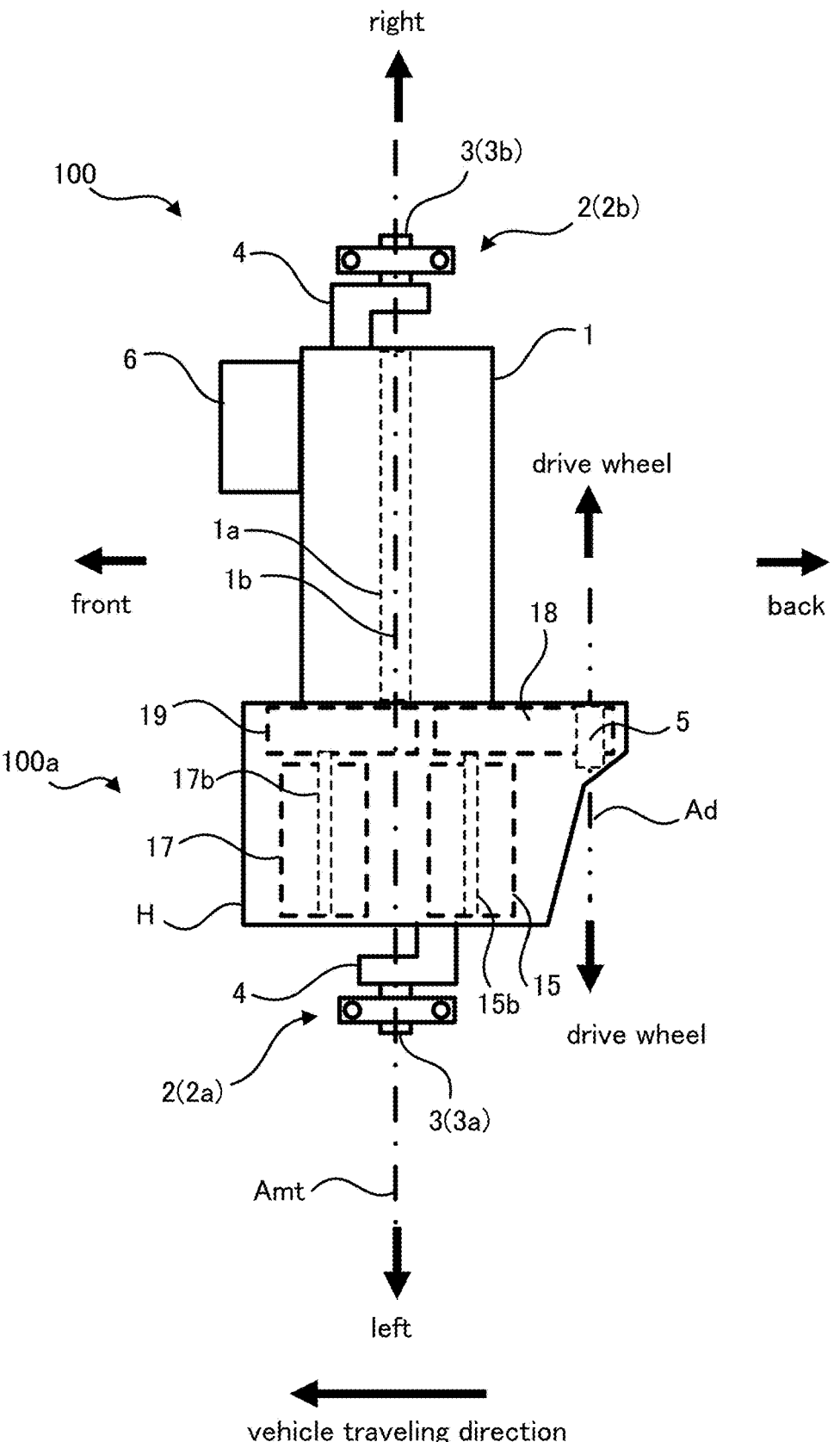
FIG. 1 is a schematic configuration diagram of a drive unit in a vehicle-mounted state as viewed from above a vehicle.
Figure 2:
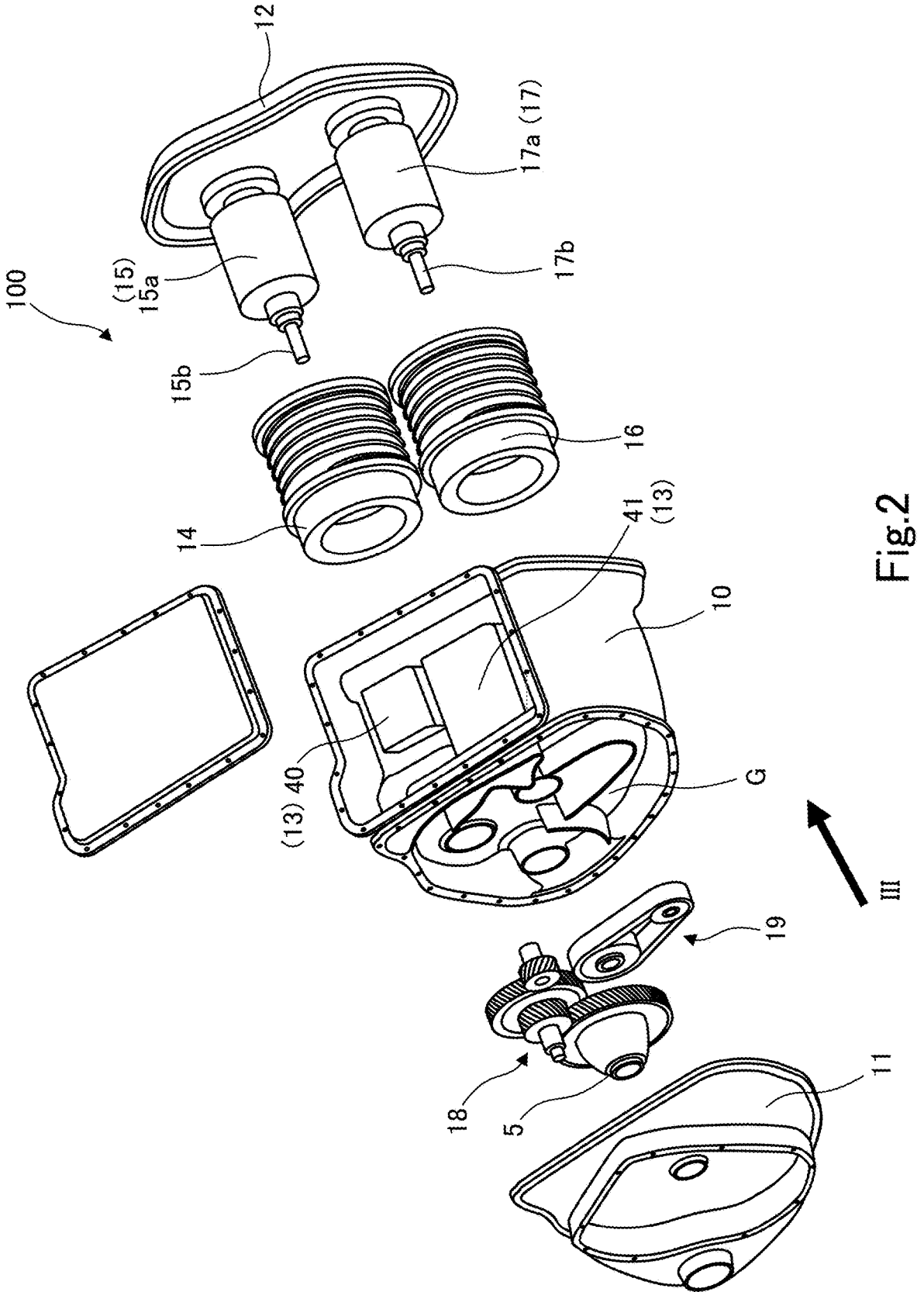
FIG. 2 is an exploded perspective view of an electric unit included in the drive unit.
Figure 3:
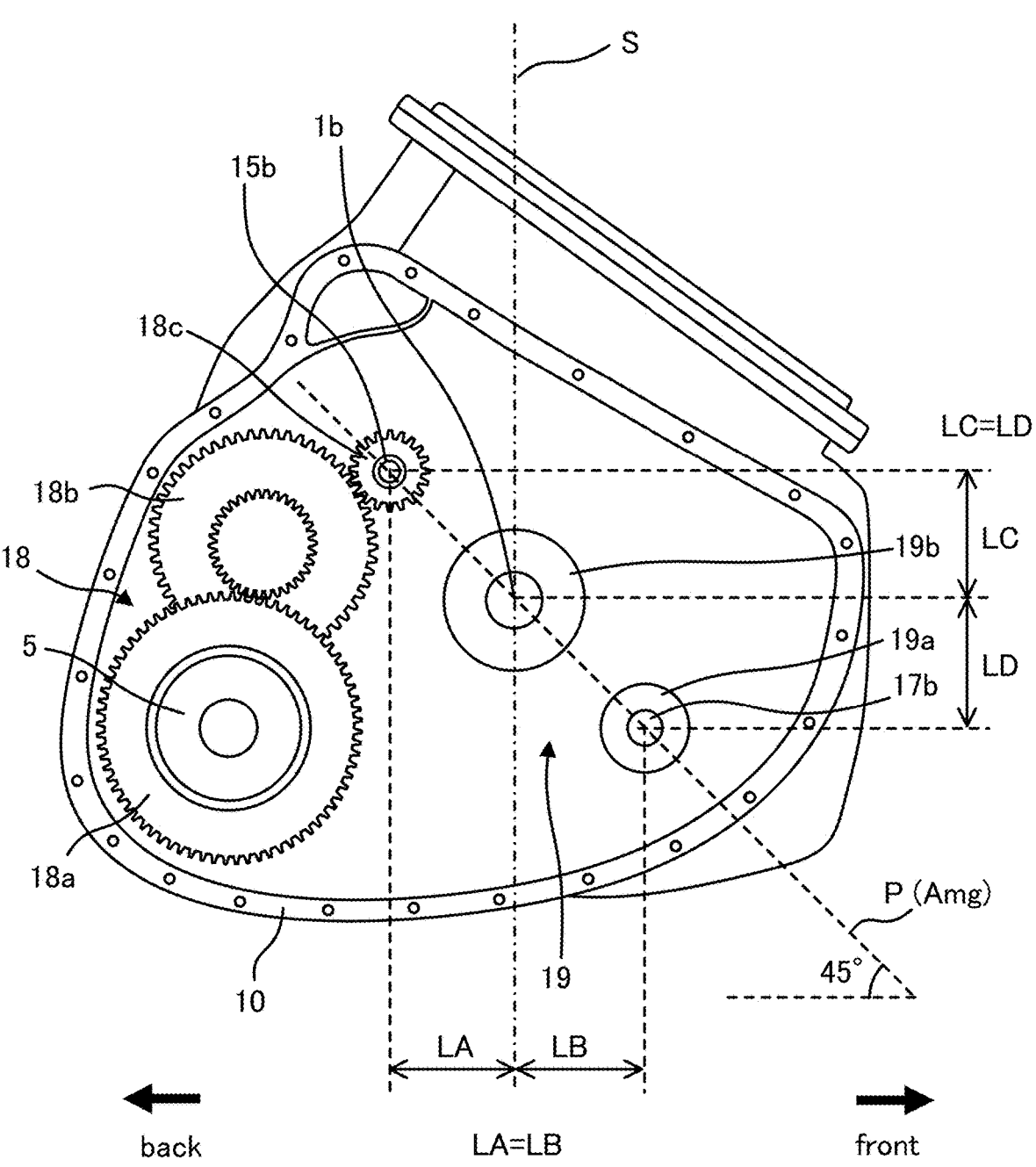
FIG. 3 is a side view of the electric unit as viewed in a direction of an arrow III in FIG. 2.

FIG. 1 is a schematic configuration diagram of a drive unit 100 according to the present embodiment in a vehicle-mounted state as viewed from above a vehicle. FIG. 2 is an exploded perspective view of an electric unit 100a included in the drive unit 100. FIG. 3 is a side view of the electric unit 100a as viewed in a direction of an arrow III in FIG. 2.

In the following description, a vehicle traveling direction is referred to as "front", an opposite direction thereto is referred to as "rear", and facing the vehicle traveling direction, a left side is referred to as "left", a right side is referred to as "right", an upper side is referred to as "upper", and a lower side is referred to as "lower".

The drive unit 100 includes an internal combustion engine 1 and the electric unit 100a to be described later. The internal combustion engine 1 is disposed in an orientation in which a crankshaft 1a coincides with a left-right direction of the vehicle. The electric unit 100a is arranged with the internal combustion engine 1 in the left-right direction of the vehicle. The internal combustion engine 1 and the electric unit 100a are fastened by bolts or the like. An auxiliary component 6 is attached to the internal combustion engine 1. The auxiliary component 6 is, for example, an oil cooler, a compressor for an air conditioner, or the like.

The internal combustion engine 1 and the electric unit 100a (that is, the drive unit 100) which are fastened to each other are supported on the vehicle body from the left-right direction of the vehicle by pendulum type mounts 2a and 2b. Here, support portions of the mounts 2a and 2b are denoted by 3a and 3b, respectively. In addition to the mounts 2a and 2b, a torque rod (not illustrated) that supports the drive unit 100 in the front-rear direction of the vehicle may be provided.

Here, a configuration of the electric unit 100a will be described with reference to FIG. 2.

A housing H of the electric unit 100a includes an outer housing 10, a gear cover 11 attached to one end portion of the outer housing 10, and a rear cover 12 attached to the other end portion of the outer housing 10.

The outer housing 10 includes a first cylindrical portion (not illustrated) in which a drive motor 15 is housed and a second cylindrical portion (not illustrated) in which a power generation motor 17 is housed. The first cylindrical portion and the second cylindrical portion are each formed in a cylindrical shape, and are provided in the outer housing 10 such that their axes are arranged in parallel to each other. The drive motor 15 which is a first electric motor is housed in the first cylindrical portion via an inner housing 14, and the power generation motor 17 which is a second electric motor is housed in the second cylindrical portion via an inner housing 16. When the drive motor 15 and the power generation motor 17 are compared, the drive motor 15 requiring a larger output is heavier than the power generation motor 17.

The drive motor 15 includes a rotor 15a rotatably supported by the rear cover 12 and a stator (not illustrated) fixed inside the inner housing 14. The power generation motor 17 includes a rotor 17a rotatably supported by the rear cover 12, and a stator (not illustrated) fixed inside the inner housing 16. The inner housings 14 and 16 and the rear cover 12 are fixed to the outer housing 10 by bolts or the like, whereby the rotors 15*a* and 17*a* and the stators are fixed at positions facing each other.

An inverter 13 is placed on an upper portion of the outer housing 10. The inverter 13 includes a first power module 40 and a second power module 41 that constitute an inverter circuit. The upper portion referred to herein is a portion above a plane including a first rotation shaft 15*b* which is a rotation shaft of the drive motor 15, and a second rotation shaft 17*b* which is a rotation shaft of the power generation motor 17. In the present embodiment, the electric unit 100*a* is mounted on the vehicle in a state where a plane P including the first rotation shaft 15*b* and the second rotation shaft 17*b* is inclined with respect to a horizontal direction as illustrated in FIG. 3 to be described later. More specifically, the electric unit 100*a* is mounted on the vehicle in an inclined state such that the drive motor 15 is located higher than the power generation motor 17.

In a gear chamber G formed by the outer housing 10 and the gear cover 11, a deceleration mechanism 18 connected to the rotation shaft 15*b* of the drive motor 15 and an acceleration mechanism 19 connected to the rotation shaft 17*b* of the power generation motor 17 are housed.

The deceleration mechanism 18 includes three gears, and decelerates rotation of the rotation shaft 15*b* of the drive motor 15 and transmits the rotation to a drive wheel (not illustrated). An output shaft 5 of the deceleration mechanism 18 and the drive wheel are connected via a drive shaft (not illustrated). The output shaft 5 is disposed in an orientation orthogonal to a traveling direction of the vehicle due to its nature. The rotation shaft of each gear of the deceleration mechanism 18 and the first rotation shaft 15*b* that inputs rotation to the deceleration mechanism 18 are parallel to the output shaft 5. In addition, the second rotation shaft 17*b* parallel to the first rotation shaft 15*b* is also parallel to the output shaft 5. Further, the crankshaft 1*a* of the internal combustion engine 1 connected to the second rotation shaft 17*b* via the acceleration mechanism 19 is also parallel to the output shaft 5.

The acceleration mechanism 19 accelerates rotation of the crankshaft 1*a* of the internal combustion engine 1 and transmits the rotation to the power generation motor 17. In the present embodiment, a mechanism including sprockets and a chain as illustrated in FIG. 3 is exemplified as the acceleration mechanism 19, but a mechanism including two gears may be used.

When the deceleration mechanism 18 and the acceleration mechanism 19 are compared, the deceleration mechanism 18 including three gears is heavier than the acceleration mechanism 19 including two sprockets and a chain or two gears.

As described above, in the electric unit 100*a* of the present embodiment, four elements of the drive motor 15, the acceleration mechanism 19, the power generation motor 17, and the deceleration mechanism 18 are housed in one housing H. Further, the inverter 13 is placed on the housing H.

Returning to the illustration of FIG. 1.

A crankshaft rotation axis 1*b* is parallel to a mount connecting line Amt connecting the support portions 3*a* and 3*b* of the mounts 2*a* and 2*b*, and is on a vertical plane S including the mount connecting line Amt as illustrated in FIG. 3. The mount connecting line Amt is also parallel to the output shaft 5 of the deceleration mechanism 18.

In the drive unit 100 in the vehicle-mounted state, the first rotation shaft 15*b* and the second rotation shaft 17*b* are located on a front side and a rear side in the front-rear direction of the vehicle with a rotation shaft (also referred to as the crankshaft rotation axis) 1*b* of the crankshaft 1*a* interposed therebetween.

More specifically, the drive motor 15 is disposed on a rear side of the crankshaft rotation axis 1*b*, and the power generation motor 17 is disposed on a front side of the crankshaft rotation axis 1*b*. Accordingly, the deceleration mechanism 18 is disposed on the rear side of the crankshaft rotation axis 1*b*, and the acceleration mechanism 19 is disposed on the front side of the crankshaft rotation axis 1*b*. As described above, the drive motor 15 is heavier than the power generation motor 17, and the deceleration mechanism 18 is heavier than the acceleration mechanism 19. Therefore, a center-of-gravity position of the electric unit 100*a* is on the rear side of the crankshaft rotation axis 1*b*. Thus, the auxiliary component 6 is disposed on the front side of the crankshaft rotation axis 1*b* such that the center of gravity of the drive unit 100 is located on the mount connecting line Amt when viewed from above the vehicle. As a result, vibration can be suppressed. Which of an oil cooler, a compressor for an air conditioner, and the like is to be used as the auxiliary component 6 is appropriately determined based on a weight difference between the drive motor 15 and the power generation motor 17, a weight difference between the deceleration mechanism 18 and the acceleration mechanism 19, and the like.

Here, a positional relation among the first rotation shaft 15*b*, the second rotation shaft 17*b*, and the crankshaft rotation axis 1*b* will be described in more detail with reference to FIG. 3. FIG. 3 is a view of the housing H of the electric unit 100*a* as viewed from a direction along the arrow III in FIG. 2 (that is, the left-right direction of the vehicle).

In FIG. 3, the crankshaft rotation axis 1*b* is located on a motor connecting line Amg passing through the first rotation shaft 15*b* and the second rotation shaft 17*b* and at a midpoint between the first rotation shaft 15*b* and the second rotation shaft 17*b*. In addition, the motor connecting line Amg is preferably inclined by 450 with respect to the horizontal plane.

Since the drive motor 15 and the power generation motor 17 are obliquely disposed with respect to the horizontal plane in this manner, a dimension of the drive unit 100 in the front-rear direction can be reduced. The reason why the inclination is preferably 45° is that it is possible to achieve both suppression of a dimension in the front-rear direction and suppression of a dimension in an up-down direction of the drive unit 100. That is, when the inclination is larger than 45°, the dimension in the front-rear direction can be further suppressed, but the dimension in the up-down direction becomes larger than that in the case of 45°, and when the inclination is smaller than 45°, the dimension in the up-down direction can be further suppressed, but the dimension in the front-rear direction becomes larger than that in the case of 45°. In contrast, when the inclination is 45°, both the suppression of the dimension in the front-rear direction and the suppression of the dimension in the up-down direction can be achieved.

In addition, the electric unit 100*a* vibrates integrally because it is housed in the one housing H, but with the above-mentioned configuration, it is possible to achieve both suppression of vibration in the up-down direction and suppression of vibration in the left-right direction of the electric unit 100*a*. That is, when the inclination is larger than 45°, the vibration in the up-down direction can be further suppressed, but the vibration in the front-rear direction becomes larger than that in the case of 45°, and when the inclination is smaller than 45°, the vibration in the front-rear direction can be further suppressed, but the vibration in the up-down direction becomes larger than that in the case of 45°. In contrast, when the inclination is 45°, both the suppression of the vibration in the up-down direction and the suppression of the vibration in the front-rear direction can be achieved.

Next, functions and effects of the drive unit 100 with the configuration of the present embodiment will be described.

The present embodiment provides the drive unit 100 including: an electric unit, the electric unit including the drive motor 15, the deceleration mechanism 18 that transmits a rotation torque of the drive motor 15 to the drive wheel, the power generation motor 17 driven by the internal combustion engine 1 to generate electric power, and the acceleration mechanism 19 that transmits a rotation torque of the internal combustion engine 1 to the power generation motor 17. In the drive unit 100, the drive motor 15, the deceleration mechanism 18, the power generation motor 17, and the acceleration mechanism 19 are housed in one housing H, and in the housing H, the drive motor 15 and the power generation motor 17 are arranged in the front-rear direction of the vehicle in a state where respective rotation shafts thereof are parallel to each other, and the deceleration mechanism 18 and the acceleration mechanism 19 are arranged in the front-rear direction of the vehicle. In addition, the electric unit 100a and the internal combustion engine 1 are connected in a state of being arranged in the left-right direction of the vehicle, and the first rotation shaft 15b which is the rotation shaft of the drive motor 15 and the second rotation shaft 17b which is the rotation shaft of the power generation motor 17 are located on the front side and the rear side in the front-rear direction of the vehicle with the crankshaft rotation axis 1b which is the rotation shaft of the crankshaft 1a of the internal combustion engine 1 interposed therebetween. As described above, since the drive motor 15 and the power generation motor 17, which are main vibration sources of the electric unit 100a, are housed in the one housing H, it is possible to suppress the drive motor 15 and the power generation motor 17 from vibrating in individual modes. In addition, since the first rotation shaft 15b and the second rotation shaft 17b are disposed on the front side and the rear side of the crankshaft rotation axis 1b of the internal combustion engine 1 which is a maximum heavy load in the drive unit 100, the center of gravity of the drive unit 100 is located between the first rotation shaft 15b and the second rotation shaft 17b. As a result, vibration of the drive unit 100 can be suppressed.

In the present embodiment, the electric unit 100a and the internal combustion engine 1 in the connected state are supported by the vehicle body in the left-right direction of the vehicle by the pendulum mounts 2a and 2b, and the mount connecting line Amt, which is a line connecting the support portion 3a of the mount 2a on the left side in the left-right direction of the vehicle and the support portion 3b of the mount 2b on the right side in the left-right direction of the vehicle, is parallel to the output shaft 5 of the deceleration mechanism 18. As a result, the crankshaft rotation axis 1b, the first rotation shaft 15b, the second rotation shaft 17b, and the output shaft 5 are parallel to the mount connecting line Amt. In a case where these rotation shafts and the like are not parallel to the mount connecting line Amt, the vibration of the drive unit 100 is transmitted to the vehicle as so-called torsional vibration, and undesirable vibration is generated in the vehicle body. In contrast, according to the configuration of the present embodiment, the torsional vibration can be suppressed.

The reason why the mount connecting line Amt can be made parallel to respective shafts 1b, 15b, 17b, and 5 is as follows.

The position of the support portion 3b of the mount 2b supporting the internal combustion engine 1 in the front-rear direction of the vehicle is preferably close to a center-of-gravity axis of the internal combustion engine 1 in the left-right direction of the vehicle from a viewpoint of suppressing a moment around the support portion 3b. On the other hand, the position of the support portion 3a of the mount 2a supporting the electric unit 100a in the front-rear direction of the vehicle is preferably close to a center-of-gravity axis of the electric unit 100a in the left-right direction of the vehicle from the viewpoint of suppressing the moment around the support portion 3b. However, the power generation motor 17 needs to be connected to the internal combustion engine 1 via the acceleration mechanism 19, and the drive motor 15 and the deceleration mechanism 18 need to be disposed so as to avoid interference with the power generation motor 17 and the acceleration mechanism 19. Therefore, in a configuration in which the drive motor 15 and the power generation motor 17 are respectively housed in separate cases as in the related art, deviation in dimension in the front-rear direction of the vehicle between the electric unit 100a and the internal combustion engine 1 becomes large, and it becomes difficult to make the mount connecting line Amt parallel to the respective shafts 1b, 15b, 17b, and 5.

In this regard, in the present embodiment, since the drive motor 15 and the power generation motor 17 are housed in the outer housing 10, the dimension of the electric unit 100a in the front-rear direction of the vehicle is reduced as compared with a case where the respective motors are housed in different housings.

In addition, in order to connect respective elements of the internal combustion engine 1, the acceleration mechanism 19, and the power generation motor 17, in a configuration in which the acceleration mechanism 19 and the power generation motor 17 are respectively housed in different housings as in the related art, the acceleration mechanism 19 is configured by three gears in order to avoid interference of the respective elements in the front-rear direction of the vehicle. That is, three gears are arranged in the front-rear direction of the vehicle. On the other hand, in the present embodiment, since the acceleration mechanism 19 and the power generation motor 17 are housed in the outer housing 10, a degree of freedom of layout is increased, and as described above, the acceleration mechanism 19 can be configured by two sprockets and a chain or two gears. As a result, the dimension in the front-rear direction of the vehicle of the electric unit 100a in the front-rear direction of the vehicle is reduced as compared with the case where the acceleration mechanism 19 is configured by three gears.

Further, in the present embodiment, the inverter 13 is also housed in the outer housing 10. In a case where the inverter 13 is housed in a housing (inverter housing) different from the drive motor 15 and the like, and the housing is attached to the housing (motor housing) accommodating the drive motor 15 and the like, the inverter housing protrudes from the motor housing, and an overhang in the front-rear direction of the vehicle tends to be large. In contrast, in the configuration in which the inverter 13 is also housed in the outer housing 10 as in the present embodiment, the above-mentioned overhang in the front-rear direction of the vehicle can be prevented.

In the present embodiment, since the dimension and the overhang in the front-rear direction of the vehicle are suppressed as described above, it is possible to make the mount connecting line Amt parallel to the respective shafts 1*b*, 15*b*, 17*b*, and 5 while setting the position of the support portion 3*a* of the mount 2*a* in the front-rear direction to a position suitable for supporting the electric unit 100*a*.

In the present embodiment, the crankshaft rotation axis 1*b* is parallel to the mount connecting line Amt and is on the vertical plane S including the mount connecting line Amt. Since the crankshaft rotation axis 1*b* of the internal combustion engine 1, which is the maximum heavy load in the drive unit 100, is on the vertical plane S including the mount connecting line Amt, it is possible to suppress the vibration of the drive unit 100 about the support portions 3*a* and 3*b*.

In the present embodiment, the drive motor 15 is heavier than the power generation motor 17, the acceleration mechanism 19 is heavier than the deceleration mechanism 18, the drive motor 15 and the deceleration mechanism 18 are disposed on a rear side of the vehicle with respect to the crankshaft rotation axis 1*b*, and the power generation motor 17 and the acceleration mechanism 19 are disposed on a front side of the vehicle with respect to the crankshaft rotation axis 1*b*. Since at least a part of a plurality of auxiliary components 6 of the internal combustion engine 1 is disposed on the front side of the vehicle with respect to the crankshaft rotation axis 1*b*, the center of gravity of the entire drive unit 100 is located on the mount connecting line Amt. As a result, the vibration of the entire drive unit 100 can be further suppressed by adjusting a balance in a state of being supported by the mounts 2*a* and 2*b*.

In the present embodiment, when viewed in the left-right direction of the vehicle, the crankshaft rotation axis 1*b* is located at the midpoint of the motor connecting line Amg which is a line connecting the first rotation shaft 15*b* and the second rotation shaft 17*b*, and the motor connecting line Amg is inclined by 45 degrees with respect to the horizontal plane. As a result, it is possible to achieve both suppression of the dimension in the front-rear direction and suppression of the dimension in the up-down direction of the drive unit 100.

Although the embodiment of the present invention has been described above, the above embodiment is merely a part of application examples of the present invention and does not intend to limit the technical scope of the present invention to the specific configurations of the above embodiment.

The invention claimed is:

1. A drive unit comprising:
an electric unit comprising a first electric motor for driving, a deceleration mechanism configured to transmit a rotation torque of the first electric motor to a drive wheel, a second electric motor configured to be driven by an internal combustion engine to generate electric power, and an acceleration mechanism configured to transmit a rotation torque of the internal combustion engine to the second electric motor, wherein:
the first electric motor, the deceleration mechanism, the second electric motor, and the acceleration mechanism are housed in one housing, and
in the housing:

the first electric motor and the second electric motor are arranged in a front-rear direction of a vehicle with their respective rotation shafts parallel,
the deceleration mechanism and the acceleration mechanism are arranged in the front-rear direction of the vehicle,
the electric unit and the internal combustion engine are connected in a state of being arranged in a left-right direction of the vehicle,
a first rotation shaft which is the rotation shaft of the first electric motor and a second rotation shaft which is the rotation shaft of the second electric motor are located on a front side and a rear side in the front-rear direction of the vehicle with a crankshaft rotation axis which is a rotation axis of a crankshaft of the internal combustion engine interposed therebetween, and
when viewed in the left-right direction of the vehicle, the crankshaft rotation axis is located at a midpoint of a motor connecting line which is a line connecting the first rotation shaft and the second rotation shaft.

2. The drive unit according to claim 1, wherein:
the electric unit and the internal combustion engine in a connected state are supported by the vehicle body in the left-right direction of the vehicle by a pendulum type mount, and
a mount connecting line, which is a line connecting a support portion of the mount on a left side in the left-right direction of the vehicle and a support portion of the mount on a right side in the left-right direction of the vehicle, is parallel to an output shaft of the deceleration mechanism.

3. The drive unit according to claim 2, wherein:
the crankshaft rotation axis is parallel to the mount connecting line and is on a vertical plane including the mount connecting line.

4. The drive unit according to claim 3, wherein:
the first electric motor is heavier than the second electric motor, the acceleration mechanism is heavier than the deceleration mechanism, and
the first electric motor and the deceleration mechanism are disposed on a rear side of the vehicle body with respect to the crankshaft rotation axis, the second electric motor and the acceleration mechanism are disposed on a front side of the vehicle body with respect to the crankshaft rotation axis, and at least a part of a plurality of auxiliary components of the internal combustion engine is disposed on the front side of the vehicle body with respect to the crankshaft rotation axis, whereby a center of gravity of the entire drive unit is located on the mount connecting line.

5. The drive unit according to claim 4, wherein:
when viewed in the left-right direction of the vehicle body, the motor connecting line is inclined by 45 degrees with respect to a horizontal plane.

* * * * *